ERWIN M. ROSCHKE
*INVENTOR.*
BY Francis W. Crotty
HIS ATTORNEY

Nov. 25, 1952 E. M. ROSCHKE 2,619,530

CONTROL SYSTEM FOR SUBSCRIPTION TYPE TELEVISION RECEIVERS

Filed Nov. 19, 1949 2 SHEETS—SHEET 2

ERWIN M. ROSCHKE
*INVENTOR.*

BY Francis W. Crotty

HIS ATTORNEY

Patented Nov. 25, 1952

2,619,530

UNITED STATES PATENT OFFICE 2,619,530

CONTROL SYSTEM FOR SUBSCRIPTION TYPE TELEVISION RECEIVERS

Erwin M. Roschke, Broadview, Ill., assignor to Zenith Radio Corporation, a corporation of Illinois Application November 19, 1949, Serial No. 128,325

8 Claims. (Cl. 178—5.1)

Figure 1:
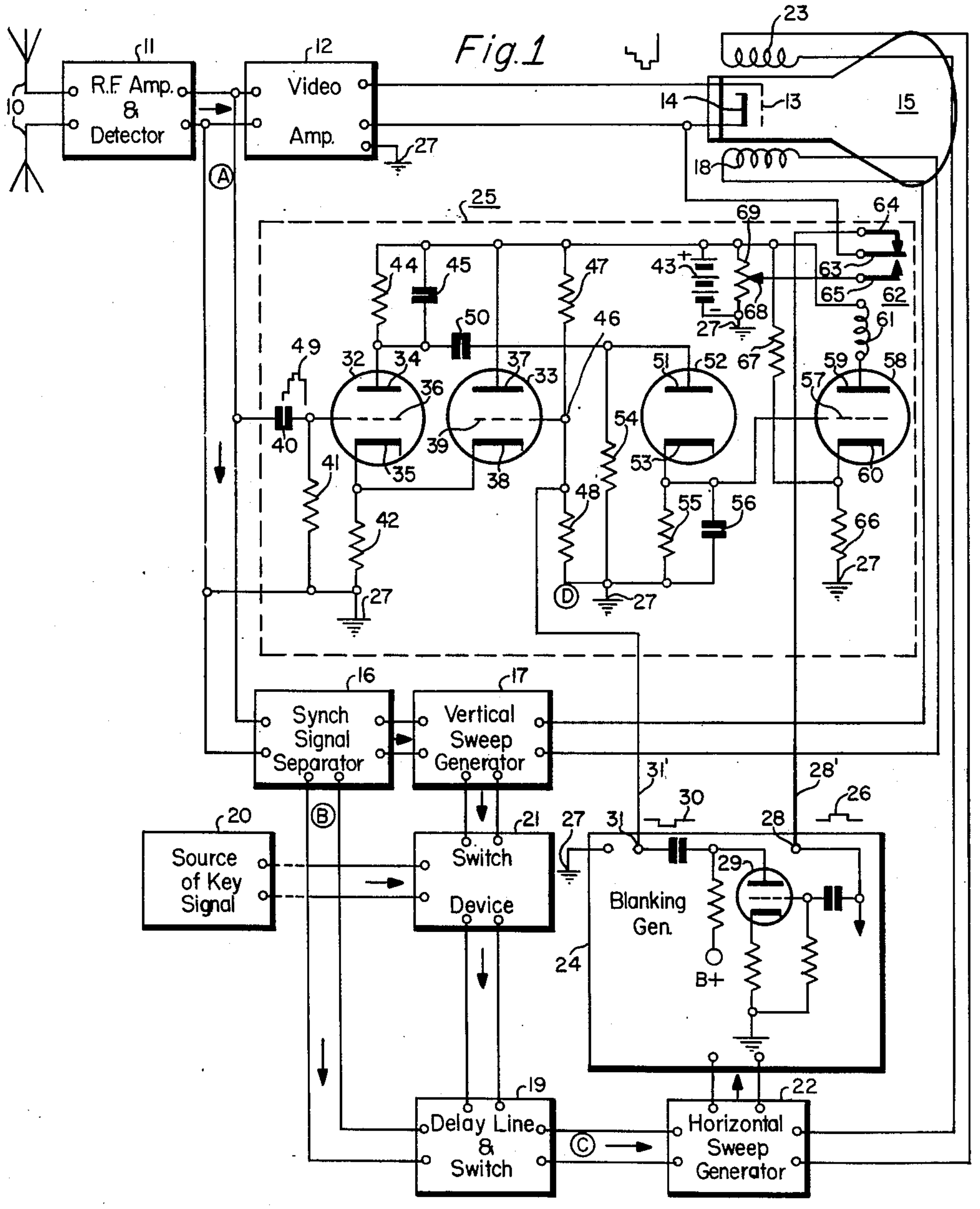

This invention relates to a control system for a subscription type television receiver and more particularly to such a system adapted to disable the reproducing device of a subscription receiver when the receiver is adjusted to translate a coded television signal, but fails to receive the key signal necessary for decoding the television signal. Although the invention has application in various environments, it is ideally suited for use with subscription apparatus of the type disclosed in copending application of Richard O. Gray, Serial No. 74,821, filed February 5, 1949, and assigned to the same assignee as the present application. For convenience, the invention will be described in that connection.

Patent No. 2,510,046 issued on May 30, 1950, in the name of Alexander Ellett et al., for "Radio-Wire Signalling System"; Patent No. 2,547,598 issued on April 3, 1951, in the name of Erwin M. Roschke for "Image Transmission System," and the copending application of Pierce E. Reeves, Serial No. 31,345, filed June 5, 1948 for "Subscriber Transmission System," all of which are assigned to the same assignee as the present application, specifically disclose certain subscription type television transmitting and receiving apparatus. The Ellett et al. patent is directed to a subscriber system in which the television signal is transmitted in coded form over one channel and a key signal is supplied over another channel to subscribers' receivers to effect decoding of the transmitted television signal. The Roschke patent is directed to a similar system in which coding of the television signal is accomplished by varying the time relation between the video signal components and the synchronizing signal components recurrently between two different modes or conditions while the key signal indicates the instantaneous mode of the coded television signal. The Reeves application is directed to a system employing a transmitted signal like that described in the Roschke patent, but includes means at the transmitter for eliminating a flicker effect. The means employed results in a transmitted coded television signal which includes video information during trace intervals and includes, during retrace intervals, a pedestal pulse and a superposed synchronizing signal which changes position on the pedestal in accordance with a coding schedule.

One purpose of a subscription system is to transmit a coded television signal which can be decoded only by an authorized subscriber and from which the intelligence cannot be taken by a nonauthorized subscriber employing a conventional television receiver. It is only by the use of a properly equipped receiver that the coded television signal can be decoded in response to a key signal which, in a particular example, is supplied to the subscriber via a closed transmission line. However, if a subscription type receiver is adjusted to translate a coded television signal and the required key signal is absent, the reproducing device may respond to the coded signal and present unintelligible as well as undesirable information.

It is therefore an object of this invention to provide a novel control system for disabling a reproducing device of a subscription type receiver in response to a predetermined signal condition.

It is a still further object of this invention to provide in a receiver adapted to respond conjointly to a coded composite television signal and a key signal, a novel control system to disable a reproducing device in the absence of a key signal otherwise required for decoding the coded television signal.

In accordance with the invention, the control system is adapted to be employed in a subscription television receiver which utilizes a key signal representing a coding schedule and conjointly utilizes a coded television signal which includes video information during trace intervals and includes, during retrace intervals, a pedestal pulse and a superposed synchronizing signal which changes position on the pedestal in accordance with that coding schedule. The control system comprises a generator for producing gating pulses of approximately the duration of the pedestal pulses. A synchronizing signal separator controls the generator to cause the gating pulses to occur in a fixed time relation with respect to the synchronizing signals, and an auxiliary timing device is coupled to the generator and is responsive to the key signal to modify the timing of the generator and cause the gating pulse to be coincident with the pedestal pulses. The control system further comprises a pulse comparing circuit for comparing the time relation of the pedestal pulses and the gating pulses to develop a control potential in response to a variation in the timed relation of the compared pulses. Means are provided for utilizing the control potential to disable a reproducing device which is included in the system.

Figure 2:
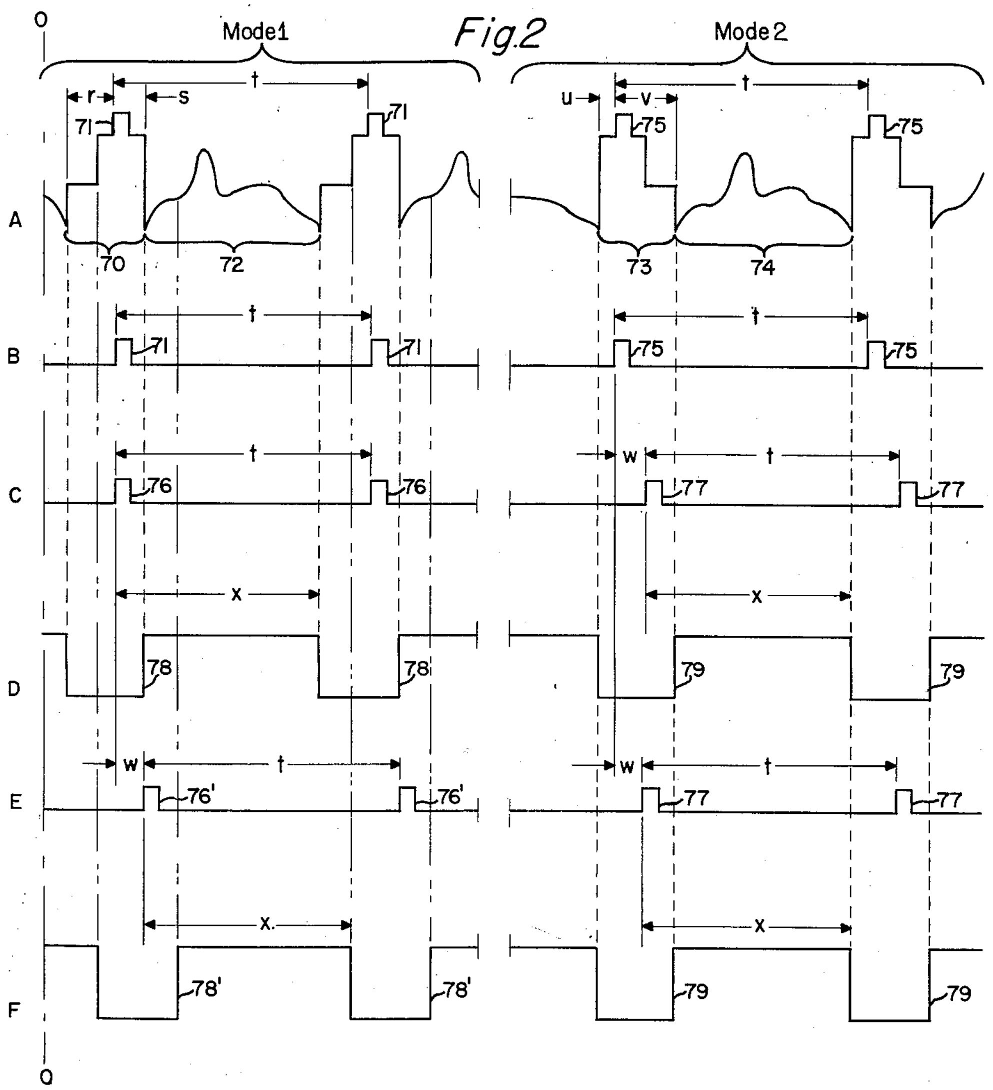
Figure 3:
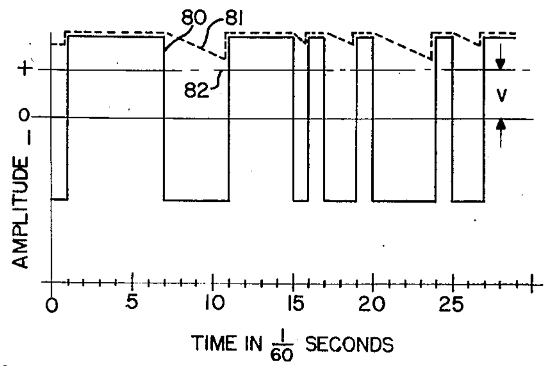

The features of the present invention which are believed to be novel are set forth with particularity in the appended claims. The present invention itself, both as to its organization and manner of operation, together with further objects and advantage thereof may best be understood by reference to the following description taken in connection with the accompanying drawings in which:

Fig. 1 is a diagram, partly schematic, of a television receiver including a control system embodying the present invention, Fig. 2 is a simplified graphical representation particularly useful in understanding the invention; and, Fig. 3 represents certain voltage conditions for a portion of the circuit of Fig. 1.

With reference to the system of Fig. 1, radiated composite television signals including video information during trace intervals and including, during retrace intervals, a pedestal pulse and a superposed synchronizing signal which changes position on the pedestal in accordance with a coding schedule, are received by an antenna 10 and are transmitted to a tunable radio-frequency amplifier and detector 11. The detected composite signals from the output of stage 11 are amplified by a video amplifier 12 and are applied between the grid or control electrode 13 and the ungrounded cathode 14 of an image reproducing device or picture tube 15, thereby to modulate the electron beam of such device. Synchronizing signal pulses are separated from the output signal of system 11 by means of a synchronizing signal separator 16 which may be of conventional construction, and the vertical synchronizing pulses are supplied to a vertical sweep generator 17, the output of which is supplied to the vertical deflection coil 18 associated with reproducing device 15.

The horizontal synchronizing signal pulses are supplied to a delay line and switch network 19 which is so arranged as to allow the horizontal synchronizing signal pulses to pass undelayed in the presence of a key signal from an external source 20 and to delay the horizontal synchronizing signal pulses in the absence of a key signal from source 20, or vice versa. Such control of the horizontal synchronizing signal pulses is effected by means of a switch device 21 in which the vertical synchronizing signal pulses are superposed on the key signal, connected between the key signal source 20 and delay line and switch network 19 in a manner disclosed in the aforementioned Roschke patent. The horizontal synchronizing signal pulses from delay line and switch 19 are supplied to a horizontal sweep generator 22, the output of which is coupled to the horizontal deflection coil 23 associated with image reproducing device 15. Vertical sweep generator 17 and horizontal sweep generator 22 and the responsive deflection coils 18 and 23 constitute a scanning system for recurrently scanning the viewing screen of device 15 which functions in well known manner.

Horizontal sweep signals from horizontal sweep generator 22 are employed to trigger a blanking voltage generator 24 which supplies, at spaced time intervals to the cathode 14 of image reproducing device 15, gating or blanking pulses of approximately the duration of the pedestal pulses included in the coded television signal and of a voltage magnitude sufficient to bias picture tube 15 beyond cutoff thereby to extinguish the trace of such device. These pulses are supplied to device 15 through a pulse comparing circuit 25 which will be described more fully hereinafter. Reference is made to the Gray application which discloses the construction and manner of operation of unit 24.

Reference is also made to the afore-mentioned Roschke patent for a discussion of the construction and manner of operation of components 19 and 21. Components 11, 12, 16, 17 and 22 may be of conventional construction.

Neglecting for the moment the operation of the control system embodying the invention and of the pulse comparing circuit 25, the circuit above-described comprises a subscriber type television receiver for utilizing a key signal representing a coding schedule and for conjointly utilizing a television signal coded according to this schedule. The coded television signal includes both video signal components and synchronizing signal components occurring alternately in two different modes in which the time relations between the components are different, changing from one mode to the other in accordance with the coding schedule. This signal is intercepted by antenna circuit 10, selected, amplified and detected in stage 11 and the detected components are amplified and supplied to the intensity control grid 13 of picture tube 15 to modulate the beam intensity thereby. The detected composite signal is also supplied to the synchronizing signal separator 16 which separates out the vertical synchronizing pulse components to be utilized to control the recurrence rate of vertical sweep generator 17 in known manner. Vertical sweep generator 17 supplies a conventional vertical sweep signal to vertical deflection coils 18 to deflect the beam within device 15 according to conventional television receiver practice.

Synchronizing signal separator 16 separates the horizontal synchronizing signal components, which usually are of pulse form, from the detected composite signal and the timing of these pulses relative to the video components is altered in stage 19 in response to the key signals from source 20 which represent the coding schedule, in accordance with the practice disclosed in the afore-mentioned Roschke patent. The encoded pulses control the initiation of the sweep developed by the horizontal sweep generator 22 and the beam of picture tube 15 is deflected in response to the encoded sweep. Since the scanning of picture tube 15 is altered in accordance with the signals from source 20, or in conformance to the coding schedule, the coded time relations between the video signal components and the synchronizing signal components are properly compensated and an intelligible representation appears on the viewing screen of the picture tube 15. In the absence of a key signal from source 20, the resulting image which is reproduced by image reproducing device 15 in response to the coded television signal has little intelligence value and the control system of the present invention is applicable for disabling reproducing device 15 during such conditions of operation.

As described in the Gray application, blanking voltage generator 24 together with oscillator sweep generator 22 produce blanking or gating pulses of approximately the duration of the pedestal pulses of the coded television signal. Furthermore, synchronizing signal separator 16 controls generators 22, 24 to cause the gating pulses to occur in a fixed time relation with respect to such synchronizing signals. Switch 21 and stage 19 constitute an auxiliary timing device which is coupled to generators 22, 24. The timing device 19, 21 is responsive to key signals from source 20 to modify the timing of the generators and cause the gating pulses to be coincident with the pedestal pulses. From generators 22, 24 blanking pulses 26, which have polarity positive with respect to a ground 27, are supplied from terminal 28 to the cathode 14 of reproducing device 15 over a conductor 28' through switching means within circuit 25. Blanking generator 24 is shown to include a phase inverter stage 29 which supplies gating voltage pulses 30 at terminal 31, negative relative to ground 27, to comparing circuit 25 over a conductor 31'. It is to be understood that the phase inverter 29 is described merely as an illustrative example and any other means of obtaining pulses similar to pulses 26, but negative with respect to ground 27, may be employed.

The detected coded television signal from system 11 is supplied to a gate circuit of comparing unit 25 which includes electron-discharge devices or vacuum tubes 32 and 33. Device 32 includes an anode 34, a cathode 35 and a control electrode 36 and device 33 includes an anode 37, a cathode 38 and a control electrode 39. The output of system 11 is coupled with the control electrode 36 of tube 32 through a coupling condenser 40 and this control electrode is returned to ground 27 through a resistor 41. Cathode 35 of tube 32 and cathode 38 of tube 33 are both returned to ground 27 through a common cathode resistor 42. Anode 34 of tube 32 is connected through a parallel combination of a resistor 44 and a capacitor 45 to the positive terminal of a source of B potential shown as a battery 43, the negative terminal of which is connected to ground 27. This combination is so adjusted that signal voltages appearing across resistor 44 and having a recurrence rate greater than 100 cycles per second are effectively shunted by the capacitor 45. The combination 44, 45 should, in any event, attenuate signal frequencies of the horizontal sweep rate, or 15,750 C. P. S., and pass without attenuation signals at the coding schedule rate of variation from 10 to 30 C. P. S. The anode 37 of tube 33 is directly connected to the positive terminal of battery 43 and the grid 39 of this tube is connected to the junction 46 of a resistor 47 and a resistor 48 which form a voltage divider connected between the positive terminal of B supply 43 and ground 27.

The voltage divider 47, 48 is so adjusted that the voltage between junction 46 and ground 27 is sufficient to maintain grid 39 at a high positive potential whereby tube 33 is highly conductive. The current flowing through tube 33 and resistor 42 is such that the resulting voltage drop across resistor 42 has a magnitude sufficient to cut off the flow of current in device 32. The signals supplied to the grid 36 of device 32 from system 11 are such that the pedestal and synchronizing pulse are positive relative to ground 27 as represented by the waveform 49. Negative gating pulses 30 are supplied over conductor 31' to the grid 39 of device 33 at junction 46.

The anode 34 of device 32 is coupled through a coupling condenser 50 to the anode 51 of a unidirectionally conductive device 52, here illustrated as a diode rectifier, which also includes a cathode 53. The anode 51 is returned to ground 27 through a resistor 54 and the cathode 53 is returned to ground through a parallel combination including a resistor 55 and a capacitor 56. Resistor 55 and condenser 56 constitute a filter network which has a discharging rate substantially longer than the slowest rate of variation in the coding schedule.

The cathode 53 of rectifier 52 is directly connected to the control electrode 57 of an electron-discharge device or relay tube 58 which also includes an anode 59 and a cathode 60. Anode 59 is connected to the positive terminal of battery 43 through a coil 61 of an electromechanical relay 62 which includes contacts constituting a single-pole double-throw switch having a movable contact 63 normally closed against a contact 64 and normally open relative to a contact 65. The cathode 60 of tube 58 is returned to ground 27 through a resistor 66 which constitutes a portion of a series voltage divider including a resistor 67 connected to the positive terminal of battery 43. Resistors 66 and 67 are so adjusted that the voltage appearing between cathode 60 and ground 27 has a high enough positive value to maintain device 58 normally in a cutoff condition, assuming that grid 57 is at ground potential through resistor 55.

Lead 28' from blanking generator 24 is connected with relay contact 64 and the cathode 14 of reproducing device 15 is connected with movable contact 63. Since contacts 63 and 64 are normally closed, positive blanking pulses 26 are normally applied to the ungrounded cathode 14 of reproducing device 15. Contact 65 of relay 62 is connected with a movable arm 68 of a potentiometer 69 which is connected between the positive and negative terminals of battery 43. Arm 68 is so adjusted that when relay 62 is operated from its normal condition into the condition wherein contacts 63 and 64 are open but contacts 63 and 65 are closed, the positive voltage supplied from arm 68 through contacts 63 and 65 to the cathode 14 of device 15 is sufficient to cut off the electron beam of picture tube 15 and thereby disable the reproducing device.

In describing the operation of the circuit of Fig. 1, reference is made to the waveforms shown in Fig. 2. It is to be understood that the term "gating" pulse, as used hereinafter, includes both blanking as well as gating pulses having the same duration and identical timing relations. Waveform A shows a detected coded television signal in modes 1 and 2 of timing, which modes alternate according to the coding schedule represented by the key signal from source 20. In mode 1, the coded signal includes a pedestal pulse 70 and a superposed synchronizing signal pulse 71. The signal further includes video information occurring during a trace interval 72, the pedestal pulse 70 occurring during and constituting a retrace interval. The leading edges of the pedestal pulse and of the synchronizing signal pulse are displaced from one another by a time interval "*r*," and the leading edge of the synchronizing pulse 71 and the start of trace interval 72 are spaced by a time interval "*s*." The synchronizing pulses are time-spaced from one another by a time interval "*t*."

In mode 2, the other of the two modes of timing, the signal includes a pedestal pulse 73 and a trace interval 74 in which the video information occurs. A synchronizing pulse 75 occupies such a position relative to pedestal 73 that the leading edges of the synchronizing pulse and of the pedestal are displaced from one another by a time "*u*," which is different from time "*r*" of mode 1. The synchronizing pulses are time-spaced by intervals "*t*" regardless of the mode. As compared with mode 1, the time spacing between the start of trace interval 74 and the leading edge of synchronizing pulse 75 is designated "*v*" and is greater than the interval "*s*" of mode 1.

The curve B of Fig. 2 represents the horizontal synchronizing pulses 71 and 75, of modes 1 and 2, as separated from the composite signal. These pulses are supplied from separator 16 to stage 19 of the receiver. Pulses 71, 75 like those of Fig. 2A, are spaced by time intervals "t" and the representation of Figs. 2A and 2B are timed similarly relative to an arbitrary zero time axis "o." It should be pointed out that all the representations of Fig. 2 are shown as related to this arbitrary axis "o."

The curve C of Fig. 2 represents the time relation of the separated synchronizing pulses delivered to generator 22 through the delay line and switch 19. For convenience of explanation it will be assumed that the key signal is presented by source 20 to switch 21 during intervals in which the received signal is in mode 1 but not during those intervals when the coded television signal is received in accordance with mode 2. The key signal and vertical synchronizing pulses applied to switch 21 conjointly condition unit 19 to pass the horizontal synchronizing pulses with no delay, whereas the unit 19 introduces a delay of "w" to such pulses in the absence of the key signal. Accordingly, pulses 77, 77 of curve C are delayed with respect to the corresponding pulses 75, 75 of the detected signal of curve A while pulses 76, 76 of curve C are essentially coincident with the pulses 71, 71 of the signal of curve A.

Signals responsive to synchronizing pulses 76 and 77 are produced by generator 22 and actuate generator 24 which produces gating pulses 78 and 79. The gating pulses 78 and 79 are delayed relative to the leading edge of respective ones of synchronizing pulses 76 and 77 by an interval "x." This time delay "x" is characteristic of stage 24 and the duration of each gating pulse approaches the duration of a retrace interval, or that of pedestals 70 and 73. Since the gating pulses are time-responsive to the synchronizing pulses 76, 77, the altered timing of these pulses in response to the key signals, is transferred to the gating pulses 78, 79. Hence, by suitably selecting the time interval "x," a gating pulse 78 is concomitant with a pedestal pulse 70 and a gating pulse 79 is concomitant with a pedestal pulse 73, as emphasized by the dash lines which extend parallel to the axis "o" of Fig. 2.

In curve E of Fig. 2 there is shown the time relation of the synchronizing pulses from stage 19 during an abnormal operating condition in which there is no key signal present to permit decoding of the received signal. Since it has been assumed that unit 19 introduces a delay "w" to the translation of synchronizing pulses in the absence of key signal, each of the pulses of curve E is so delayed with respect to the synchronizing components of the coded television signal received during this abnormal operating interval. Consequently, synchronizing pulses 76′, 76′ are applied to generator 22 during mode 1 intervals, while pulses 77, 77 are applied thereto during mode 2 intervals.

As has been pointed out hereinbefore, a gating pulse is produced for each synchronizing pulse supplied to generator 22, but delayed therefrom by a time interval "x." As a result, gating pulses are produced during the abnormal operating condition with a time relation represented by curve F. Specifically, the gating pulses 78′, 78′ developed during mode 1 intervals are time displaced with respect to the pedestal pulses 70, 70 of the received television signal as indicated by the dash-dot-dot construction lines. On the other hand, the gating pulses 79, 79 produced during mode 2 intervals remain concomitant with the pedestal pulses 73, 73 of the received signal.

Let it now be assumed that the receiver of Fig. 1 is conditioned to translate a conventional television signal. Such a signal is generally similar to that illustrated by mode 2 of Fig. 2A. Instead of an amplitude-distorted "back porch" for pedestal pulse 73, there shown, the conventional signal has a "back porch" of equal and constant amplitude as compared with the "front porch" portion of the pedestal pulse. Synchronizing pulses 75 are separated from the composite signal by stage 16 and delayed in stage 19 to effect pulses 77; pulses 77 only being produced since a key signal is not utilized for this operative condition. In response to pulses 77, gating pulses, such as 79 of Fig. 2E are formed by stage 24. Inasmuch as the gating pulses 79 occur concomitantly with the pedestal pulses 73, which blank picture tube 15, the additional blanking action of the gating pulses does not detrimentally affect the operation of the receiver.

Further, signals as in mode 2 of Fig. 2A are supplied to control grid 36 of vacuum tube 32 in system 25 and gating pulses 79 (Fig. 2D) are supplied to the control grid 39 of vacuum tube 33 within system 25. Negative pulses at grid 39 produce a voltage between cathode 38 and ground as well as between cathode 35 and ground 27, having a polarity negative relative to ground. Thus, vacuum tube 32, which is normally nonconductive or cutoff, is placed in a conductive state for the duration of each gating pulse 79. Since a pedestal pulse 73 occurs precisely during the occurrence of each gating pulse and the amplitudes of successive pedestal pulses are substantially equal, the anode current of vacuum tube 32 contains primarily an alternating component representative of the rate of occurrence of the pedestal pulses. This rate is at a frequency of 15,750 cycles per second. Inasmuch as condenser 45, which is shunted across load resistor 44 in the anode circuit of vacuum tube 32, has a low impedance at this frequency, little or no alternating voltage is produced across load 44 and no alternating voltage is applied to the anode 51 of rectifier 52. Therefore, the relay tube 58 remains cutoff and relay 62 is not actuated.

Now let it be assumed that the receiver is adjusted to translate a coded television signal and that a key signal is supplied by source 20. The coded signal appears in both modes 1 and 2 as shown in curve A and this signal is applied to the control grid 36 of vacuum tube 32. Gating pulses, as represented by curve D, are supplied to the control grid 39 of vacuum tube 33. A gating pulse 78 concurs in time with a pedestal pulse 70 and for each pedestal 73 there is a concurrent gating pulse 79; the timing of gating pulses being altered in response to key signals, as pointed out previously. Since the area enclosed by pedestal pulses 70 is substantially equal to that enclosed by pedestal pulses 73 the result described above, in connection with a conventional television signal, obtains within system 25 and relay 62 is not actuated. Further, as pointed out hereinbefore, synchronizing pulses as shown in curve C, which are timed in response to key signals, control the timing of horizontal sweep generator 22, and the horizontal sweep for picture tube 15 is altered in accordance with the coding schedule. The coded time relations between the synchronizing signal and the video signals are compensated thereby and an intelligible image is presented by reproducing device 15.

In the remaining operative condition to be considered, the receiver of Fig. 1 is tuned to receive a coded television signal and no key signal is supplied. In the absence of a key signal from source 20, the auxiliary timing device 19, 21 delays the synchronizing pulses by a time "*w*" and does not selectively modify the timing of these pulses (curve E) which are supplied to generators 22, 24 in turn, controlling the horizontal sweep trace for picture tube 15. The coded composite signal contains the video information which occurs at different times along horizontal traces of successive frames for picture tube 15 (which trace basically is a time base), depending on the mode of transmission. Thus, since the start of horizontal traces is not altered in accordance with mode changes, the coded television signal is not decoded and the image that would be produced by picture tube 15 would be substantially unintelligible.

For this condition a composite television signal, as shown in curve A, is supplied to control grid 36 of vacuum tube 32 and gating pulses, as represented in curve F, are supplied to control grid 39 of vacuum tube 33. During mode 2 of transmission, a pedestal pulse 73 is supplied to control grid 36 at the same time a gating pulse 79 is supplied to control grid 39 and the anode current of vacuum tube 32 is proportional to the area enclosed by pedestal pulse 73. During mode 1 intervals of transmission, vacuum tube 32 is placed in a conductive state for the duration of each gating pulse 78'. However, the pedestal pulse 70 is not concomitant with pulse 78' and the current passing through vacuum tube 32 is proportional to the area of that portion of pedestal pulse 70 enclosed by the right hand extremity of the pedestal pulse and by the left hand extremity of pulse 78' projected (in dash-dot-dot) upon the pedestal pulse from curve F to curve A. Thus, the current flowing through vacuum tube 32 is less for mode 1 than for mode 2.

It follows then, that the average current flowing through load 44 varies as the transmitted signal is altered from one mode to the other and the resulting voltage variations, which appear across load 44, are similar to that represented by waveform 80 of Fig. 3. The rate of this variation is relatively slow compared with the horizontal sweep rate and this low frequency signal is not attenuated by condenser 45. Curve 80 actually is representative of the voltage variations with time between anode 51 of vacuum tube 52 and ground 27 and is shown as being centered about a zero voltage axis by virtue of the presence of coupling condenser 50. The afore-going discussion neglects the presence of video signal components during the trace intervals inasmuch as such components will not materially affect comparing circuit 25 during the time periods under consideration.

In response to a waveform of the type 80 of Fig. 3, anode 51 of device 52 is carried positive and negative relative to cathode 53 in accordance with the coding schedule. During each time interval in which anode 51 is positive relative to cathode 53, current flows in device 52 through resistor 55 and a voltage drop is developed across the resistor. These time intervals are represented by the areas enclosed by those portions of curve 80 which lie above the zero axis. Also, the upper portions of curve 80 represent the unidirectionally varying voltage at cathode 53 of rectifier device 52, which voltage charges condenser 56 through the rectifier. The filter network including resistors 55 and 56 is designed to have a discharge rate longer than the slowest rate of variation in the coding schedule, or in other words, the capacitance of condenser 56 as compared with the resistance of resistor 55 is such that the condenser cannot discharge between successive voltage variations at cathode 53. Thus, device 52 and filter network 55, 56 form a peak rectifying circuit and the voltage which ultimately appears across condenser 56 is that indicated by the dash curve 81.

For the operative condition just described, in which a key signal is absent, the voltage applied between grid 57 of device 58 and ground 27, represented by curve 81, is always greater, in a polarity direction positive relative to ground 27, than a fixed voltage indicated by the dash-dot line 82. Line 82 illustrates a positive voltage V between grid 57 and ground 27. It is this positive voltage V to which the cathode 60 of device 58 is maintained by battery 43 through voltage divider 66, 67 and which normally maintains tube 58 in a non-conductive or cutoff condition. However, in the presence of a voltage shown by curve 81 at grid 57, device 58 becomes conductive and current flows through relay coil 61 to energize relay 62 and movable contact 63 is carried from engagement with contact 64 to complete a circuit with contact 65. As a result, cathode 14 of device 15 is connected through contacts 63 and 65 to the tap 68 of potentiometer resistor 69 and a positive cutoff bias is applied to the cathode 14 thereby blanking the beam and disabling image reproducing device 15. Hence, means are provided for utilizing the control potential developed by the comparing circuit to disable reproducing device 15.

Although the input signal conditions to stage 25 have been represented by waveforms 30 and 49 having particular polarity relations relative to ground, it is entirely within the scope of this invention to produce the desired control potential by utilizing pulses having other polarity conditions. Also, the gate circuit including device 32 and 33 is shown by way of example and any other form of gate may be successfully employed, for example, one including a single electron-discharge device having a plurality of control electrodes. Further, it may be seen that the portion of Fig. 1 which includes synchronizing signal separator 16, generator 22, 24 and auxiliary timing device 19, 21 may be considered as being a timer for actuating a gate circuit over recurrent periods, each of such periods approaching the duration of a pedestal pulse. The recurrence is in fixed time relation with the synchronizing pulses in response thereto, and in response to the key signal the occurrence of the periods is modified to be concurrent with the occurrence of the pedestal pulses. A control potential is developed by the gate circuit in response to a variation in the timing relation of the pedestal pulses and the recurrent periods of the timer.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a generator for producing gating pulses of approximately the duration of said pedestal pulses; a synchronizing signal separator coupled to said generator for applying timing pulses thereto to cause said gating pulses to occur in a fixed time relation with respect to said synchronizing signals; an auxiliary timing device coupled to said generator and responsive to said key signal to modify the timing of said generator and cause said gating pulses to be coincident with said pedestal pulses; means for applying said key signal to said auxiliary timing device; a pulse comparing circuit for comparing the time relation of said pedestal pulses and said gating pulses to develop a control potential in response to a variation in the time relation of the compared pulses; means for applying said pedestal pulses and said gating pulses to said comparing circuit; and means for utilizing said control potential to disable said reproducing device.

2. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a generator for producing gating pulses of approximately the duration of said pedestal pulses; a synchronizing signal separator coupled to said generator for applying timing pulses thereto to cause said gating pulses to occur in a fixed time relation with respect to said synchronizing signals; an auxiliary timing device coupled to said generator and responsive to said key signal to modify the timing of said generator and cause said gating pulses to be coincident with said pedestal pulses; means for applying said key signal to said auxiliary timing device; a pulse comparing circuit for comparing the time relation of said pedestal pulses and said gating pulses including a gate circuit supplied with said coded television signal and actuated by said gating pulses from said generator to develop a control potential in response to a variation in the time relation of the compared pulses; and means for utilizing said control potential to disable said reproducing device.

3. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a generator for producing gating pulses of approximately the duration of said pedestal pulses; a synchronizing signal separator coupled to said generator for applying timing pulses thereto to cause said gating pulses to occur in a fixed time relation with respect to said synchronizing signals; an auxiliary timing device coupled to said generator and responsive to said key signal to modify the timing of said generator and cause said gating pulses to be coincident with said pedestal pulses; means for applying said key signal to said auxiliary timing device; a pulse comparing circuit for comparing the time relation of said pedestal pulses and said gating pulses including a normally non-conductive gate circuit supplied with said coded television signal and transferred to a conductive condition in response to said gating pulses from said generator to develop a control potential in response to a variation in the time relation of the compared pulses; and means for utilizing said control potential to disable said reproducing device.

4. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a generator for producing gating pulses of approximately the duration of said pedestal pulses; a synchronizing signal separator coupled to said generator for applying timing pulses thereto to cause said gating pulses to occur in a fixed time relation with respect to said synchronizing signals; an auxiliary timing device coupled to said generator and responsive to said key signal to modify the timing of said generator and cause said gating pulses to be coincident with said pedestal pulses; means for applying said key signal to said auxiliary timing device; a circuit for comparing the time relation of said pedestal pulses and said gating pulses including a gate circuit supplied with said coded television signal and actuated by said gating pulses from said generator for developing a varying potential in response to a variation in the time relation of the compared pulses; a unidirectionally conductive device for rectifying said varying potential to produce a unidirectional control potential; and means for utilizing said control potential to disable said reproducing device.

5. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a generator for producing gating pulses of approximately the duration of said pedestal pulses; a synchronizing signal separator coupled to said generator for applying timing pulses thereto to cause said gating pulses to occur in a fixed time relation with respect to said synchronizing signals; an auxiliary timing device coupled to said generator and responsive to said key signal to modify the timing of said generator and cause said gating pulses to be coincident with said pedestal pulses; means for applying said key signal to said auxiliary timing device; a circuit for comparing the time relation of said pedestal pulses and said gating pulses including a gate circuit supplied with said coded television signal and actuated by said gating pulses from said generator for developing a varying potential in response to a variation in the time relation of the compared pulses; a unidirectionally conductive device for rectifying said varying potential; a filter network coupled to said unidirectionally conductive device and having a discharging rate substantially longer than the slowest rate of variation in said coding schedule to produce a unidirectional control potential; and means for utilizing said control potential to disable said reproducing device.

6. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a generator for producing gating pulses of approximately the duration of said pedestal pulses; a synchronizing signal separator coupled to said generator for applying timing pulses thereto to cause said gating pulse to occur in a fixed time relation with respect to said synchronizing signals; an auxiliary timing device coupled to said generator and responsive to said key signal to modify the timing of said generator and cause said gating pulses to be coincident with said pedestal pulses; means for applying said key signal to said auxiliary timing device; a pulse comparing circuit for comparing the time relation of said pedestal pulses and said gating pulses to develop a control potential in response to a variation in the time relation of the compared pulses; means for applying said pedestal pulses and said gating pulses to said comparing circuit; and a relay coupled to said pulse comparing circuit for utilizing said control potential to disable said reproducing device.

7. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a timer responsive to said synchronizing pulses for actuating a gate circuit during recurrent periods individually approaching the duration of a pedestal pulse and occurring in fixed time relation with said synchronizing pulses; means responsive to said key signal for modifying the operation of said timer to cause said recurrent periods to be coincident with said pedestal pulses; means for applying said key signal to said timer-modifying means; a gate circuit coupled to and actuated by said timer during said recurrent periods and supplied with said coded television signal to develop a control potential in response to a variation in the time relation of said pedestal pulses and said recurrent periods; and means for utilizing said control potential to disable said reproducing device.

8. In a subscription television receiver for utilizing a key signal representing a coding schedule and for conjointly utilizing a coded television signal which includes video information during trace intervals and includes, during retrace intervals, a pedestal pulse and a superposed synchronizing signal which changes position on the pedestal in accordance with said coding schedule, a control system comprising: a reproducing device; a timer responsive to said synchronizing pulses for actuating a gate circuit during recurrent periods, individually approaching the duration of a pedestal pulse and occurring in fixed time relation with said synchronizing pulses; means responsive to said key signal for modifying the operation of said timer to cause said recurrent periods to be coincident with said pedestal pulses; means for applying said key signal to said timer-modifying means; a gate circuit coupled to and actuated by said timer during said recurrent periods and supplied with said coded television signal to develop a varying potential in response to a variation in the time relation of said pedestal pulses and said recurrent periods; a rectifier coupled to said gate circuit for producing a unidirectional control potential from said varying potential; and means for utilizing said control potential to disable said reproducing device.

ERWIN M. ROSCHKE.

REFERENCES CITED

The following references are of record in the file of this patent:

UNITED STATES PATENTS

| Number | Name | Date |
|---|---|---|
| 1,754,877 | Clement | Apr. 15, 1930 |
| 1,790,486 | Roberts | Jan. 27, 1931 |
| 2,251,525 | Rosenthal | Aug. 5, 1941 |
| 2,402,067 | Mathes | June 11, 1946 |
| 2,403,059 | Dillenback | July 2, 1946 |
| 2,405,252 | Goldsmith | Aug. 6, 1946 |
| 2,454,815 | Levy | Nov. 30, 1948 |
| 2,472,774 | Mayle | June 7, 1949 |